Figure 1:
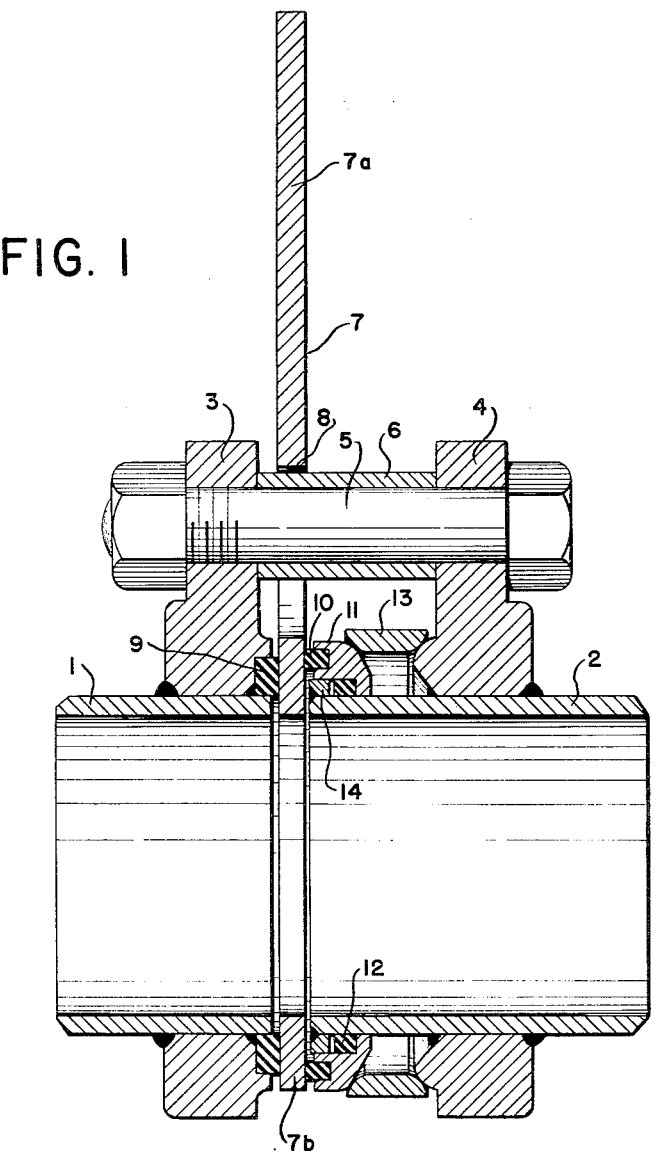

INVENTOR.
John Handley

United States Patent Office 2,800,926
Patented July 30, 1957

2,800,926

FITTING FOR CONTROLLING THE FLOW OF FLUID IN PIPE LINES

John Handley, Purley, England

Application September 28, 1954, Serial No. 458,901

Claims priority, application Great Britain September 29, 1953

4 Claims. (Cl. 138—94.5)

This invention relates to a valve fitting for controlling the flow of fluid in pipe lines, and refers to a plate valve of the kind that is inserted between the ends of two sections of pipe.

In a valve fitting of this kind, it is necessary to place a seal between each side of the plate and the pipe ends to prevent leakage and these seals are pressed against the respective sides of the plate.

In one known form this sealing pressure is applied and released by closing together and separating the ends of the pipes by bolts in the pipe flanges. The disadvantage of this method is that unless the two sections of pipe are rigidly supported the joint will not open and close in a satisfactory manner; furthermore, any mal-alignment of the two sections will result in excessive pressure at one side of the seal.

A valve fitting according to the invention includes two rigidly interconnected pipe sections, a valve plate insertable between said pipe sections, seals positioned for engagement respectively with opposite sides of the valve plate, and contractile and expansile means associated with at least one of said seals.

In practice, there are two aligned pipe sections with a rigid attachment to maintain them separated sufficiently to admit the valve plate with a stationary seal at one side of the plate and a movable seal located on the pipe end at the other side of the plate, and means provided to press the movable seal towards the plate.

To apply the side pressure in a simple and economical manner, the movable seal may have a bevelled edge, and a clamping band which when tightened by a screw or screws, thrusts the seal towards the plate.

When the screw or screws is or are fully unscrewed, the clamping band may be opened sufficiently far to allow the moving seal to slide inside it, so that there is sufficient space between the seals to replace easily the strips of sealing material.

To release or tighten the seals for opening or closing the valve it is only necessary to loosen a screw a little, or tighten it up again.

For convenience, the rigid attachment may consist of two flanges welded respectively to the pipes, these in turn being maintained in correct relationship to one another by three spacers, which may be rivetted and/or welded into the flanges. The clamping band may be made from half round steel bar stock with the two ends bent out at right angles, and screws may be located in two of the spacers to respectively engage the two ends of the clamping band. The plate may swing on the third spacer, and two small notches may be provided on the end of the plate to give a central location for the valve being open or shut.

According to a modification, I provide a clamping band with two bevelled edges which bear respectively against a bevelled edge on the moving seal and against a bevelled edge or projection on an adjacent flange, so that in closing in the band any tendency to tilt or jam the band is eliminated.

A further feature consists in the provision of anchorages on the ends of the band to take a clamping screw, which has a shoulder upon it, so that in addition to clamping the band when tightened up, it forces the band to open when unscrewed, thus easing the process of releasing the valve plate.

Shouldered studs may be provided to rigidly hold the pipe ends apart at fixed distances and these may be cut away to clear the valve plate whilst it is being moved to open or closed position, thus enabling the pitch circle of the studs to be kept down to a minimum.

According to a further modification, I provide a clamping band with two bevelled edges which bear respectively on an annular profiled surface of the moving seal backing ring and on a similar annular surface on an adjacent flange, the profiled surfaces being formed respectively on given radii so as to provide an arcuate bevel, and the angle of the bevelled edges of the clamping band may be gradually varied between the gap in the band and the opposite side of the band to maintain substantially equal axial thrust against the band even though the pull on the band is steadily reduced through frictional drag between the contacting faces.

The approximate angles used are 30 degrees at the gap and 60 degrees at the opposite side.

According to a further modification, for higher pressure, a square lip is formed on an end of a pipe section and two separate packing seals are inserted.

A clamping band is formed with two radiused contact faces, i. e., annular profiled surfaces which are arcuate in cross-section and based on a common radius, so that the angle of the contact increases as the band closes in. To compensate for frictional drag on the faces and to increase the angle of contact towards the side opposite the clamping screw, the band may be reduced in width towards the side opposite the clamping screw.

Figure 2:
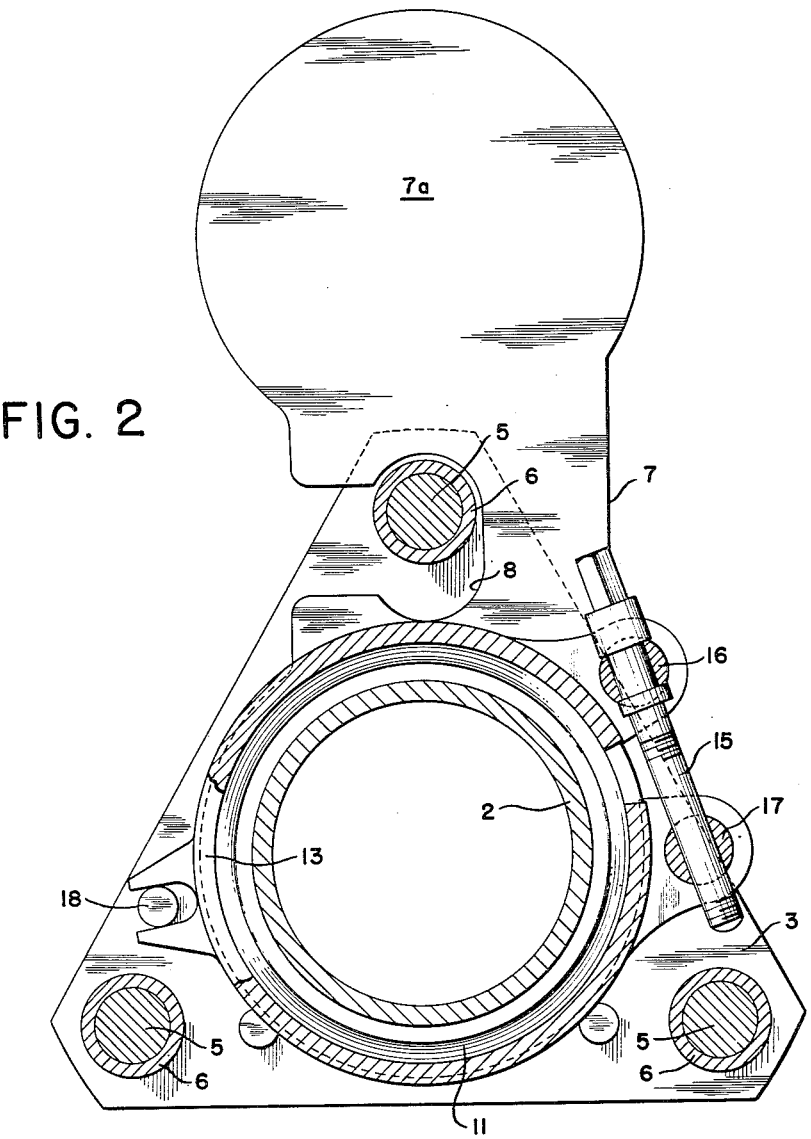
Figure 3:
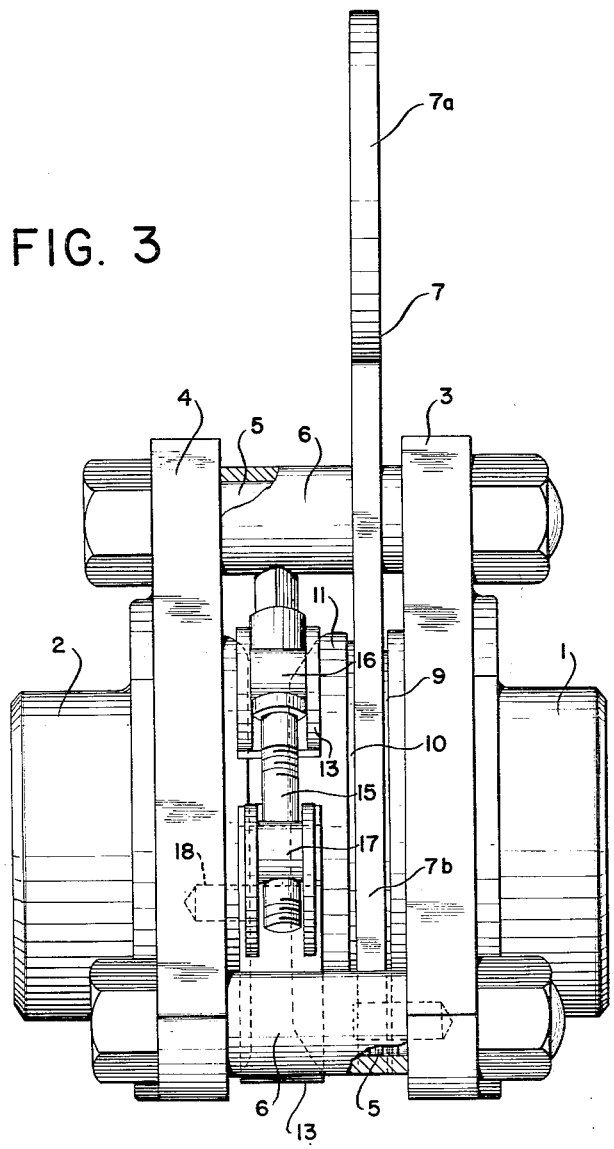

A valve fitting according to the invention is illustrated in the accompanying drawings in which Fig. 1 is an axial section, Fig. 2 a cross section, and Fig. 3 a side elevation.

Referring to the drawings, pipe sections 1, 2 adapted to be welded into a pipe line are provided with flanges 3, 4 interconnected by bolts 5 and spacers 6. 7 denotes the valve plate which is notched at 8 to pivot about one of the bolts 5 between open and shut positions in the gap between the adjacent ends of the pipe sections 1, 2. The plate 7 has a solid end 7ª and an apertured end 7ᵇ.

The sealing means includes a packing ring 9 at one side of the plate 7, a packing ring 10 at the other side of the plate 7, a backing ring 11, a packing ring 12, and a clamping band 13. The backing ring 11 is slidable on the pipe section 2, carries the packing ring 10, and is recessed to receive the packing ring 12, said ring 12 being engageable with a lip 14 welded on the pipe section 2. The clamping band 13 is formed with two radiused faces of the type referred to above which are respectively engageable with radiused faces also of the type referred to above, respectively on the ring 11 and the flange 4.

The free ends of the clamping band 13 project as shown in Fig. 2, are divided as shown in Fig. 3, and interconnected by an adjusting screw 15 journalled in a trunnion 16 and in screw-threaded engagement with a trunnion 17, the screw 15 being thus operable to release the band 13 and to tighten the band 13. The trunnions 16 and 17 are fitted respectively in the free projecting ends of the clamping band as shown in Figs. 2 and 3.

18 denotes a stop for the clamping band 13.

What is claimed is:

1. In a valve fitting of the type including two pipe sections arranged in end-to-end registering relation for fluid flow and a valve plate interposed between the registering ends of the pipe sections, means for rigidly connecting said ends of the pipe sections in fixed spaced relation, a stationary seal around one pipe section engaging one side of said valve plate, a movable seal around the other pipe section for engaging the other side of the valve plate and movable axially on said other pipe section, an expansible and contractible band extending in spaced relation around said other pipe section generally in back of the movable seal and having a bearing surface adapted to force the movable seal axially toward the valve plate when the band is contracted, and means operatively associated with and for contracting said band.

2. A valve fitting as claimed in claim 1, in which said band is provided with end bearing surfaces respectively extending from its inner periphery outwardly and axially away from each other at the ends of the band, and an abutment means fixed to said other pipe section on the side of said band opposite the movable seal, said abutment means having a bearing surface facing and engaged by the adjacent bearing surface of the band, the bearing surface of the abutment means diverging outwardly with respect to the band.

3. A valve fitting as claimed in claim 1, including a rigid movable backing ring extending around said other pipe section and carrying said movable seal, said backing ring being movable on the pipe section toward and away from the valve plate and having a bearing surface extending outwardly and toward the valve plate and engaged by the bearing surface of the band, whereby contraction of the band forces the backing ring and movable seal toward the valve plate.

4. A valve fitting as claimed in claim 1 including a further seal around said other pipe section, and a lip on said other pipe section engageable by said further seal to form a joint when the band is contracted.

References Cited in the file of this patent

UNITED STATES PATENTS

| | | |
|---|---|---|
| 2,231,690 | Sheldrick et al. | Feb. 11, 1941 |
| 2,243,227 | Stratton | May 27, 1941 |
| 2,278,849 | Hamer | Apr. 7, 1942 |
| 2,370,471 | Karlberg | Feb. 27, 1945 |
| 2,732,170 | Shand | Jan. 24, 1956 |

FOREIGN PATENTS

| | | |
|---|---|---|
| 435,277 | Great Britain | Sept. 18, 1915 |
| 649,957 | Great Britain | Feb. 7, 1951 |